United States Patent
McCalley (10) Patent No.: US 6,415,557 B1
(45) Date of Patent: Jul. 9, 2002

(54) PROTECTIVE SHELTER

(76) Inventor: Richard M. McCalley, P.O. Box 93, King Gorge, VA (US) 22485

( * ) Notice: Subject to any disclaimer, the term of this patent is extended or adjusted under 35 U.S.C. 154(b) by 0 days.

(21) Appl. No.: 09/236,607

(22) Filed: Jan. 26, 1999

(51) Int. Cl.[7] .................................................. E04H 9/14
(52) U.S. Cl. ...................... 52/79.1; 52/106; 52/285.2; 52/262; 52/270; 52/293.3; 52/584.1; 52/588.1; 109/1 S; 109/79; 109/85
(58) Field of Search .................... 52/79.1, 36.1, 52/36.2, 79.5, 79.13, 79.9, 79.12, 169.6, 106, 285.2, 588.1, 584.1, 792.1, 293.3, 262, 270; 109/78, 79, 80, 85, 1 S (56) References Cited

U.S. PATENT DOCUMENTS

| | | | | |
|---|---|---|---|---|
| 1,155,717 A | * | 10/1915 | Fouts ..................... | 52/584.1 X |
| 1,378,928 A | | 5/1921 | Witzel | |
| 1,706,496 A | | 3/1929 | Pieri | |
| 1,778,889 A | * | 10/1930 | Disbro .................. | 52/584.1 X |
| 2,281,371 A | * | 4/1942 | Mugler ........................ | 52/347 |
| 2,867,857 A | * | 1/1959 | McCarthy .................. | 52/584.1 |
| 2,936,504 A | * | 5/1960 | Le Roy Harris ........... | 52/169.6 |
| 3,208,410 A | * | 9/1965 | Hayes et al. ................ | 109/1 S |
| 3,343,314 A | * | 9/1967 | Smth ........................ | 52/262 X |
| 3,568,388 A | * | 3/1971 | Flachbarth et al. ........ | 52/588.1 |
| 4,073,107 A | | 2/1978 | Rousseau | |
| 4,126,972 A | | 11/1978 | Silen | |
| 4,450,659 A | | 5/1984 | Hanaoka et al. | |
| 4,592,175 A | * | 6/1986 | Werner ......................... | 52/79.9 |
| 4,986,040 A | * | 1/1991 | Prewer et al. ................ | 52/79.1 |
| 5,584,151 A | | 12/1996 | Abou-Rached | |
| 5,620,038 A | | 4/1997 | DeCola et al. | |
| 5,813,174 A | | 9/1998 | Waller | |
| 5,979,136 A | * | 11/1999 | Marschak .................. | 52/588.1 |
| 6,047,510 A | * | 4/2000 | Gallaway .................. | 52/581 X |

FOREIGN PATENT DOCUMENTS

| | | | | |
|---|---|---|---|---|
| JP | 52-51733 | * | 4/1977 | ................. 52/169.6 |
| JP | 56-159431 | * | 12/1981 | ................. 52/169.6 |

OTHER PUBLICATIONS

Taking Shelter From the Storm: Building a Safe Room Inside Your House, FEMA publication (Oct. 1998, 1st Ed).
"Steel Shelters For Fallout Protection", American Iron and Steel Institute, Classified in 109/1S Dec. 1961.*

* cited by examiner

Primary Examiner—Laura A. Callo
(74) Attorney, Agent, or Firm—Nath&Associates PLLC; Harold L. Novick (57) ABSTRACT

A protective shelter that is made from a plurality of elongate, vertical C-shaped panels that have web portions and perpendicular side portions, and are butt connected together with fasteners that are located in a section of the side portions that are closest to the inside portion of the shelter. A connecting cap is connected around the side portions of at least some of the adjacent panels. A cap connects a roof to the upper portions of the panels and the lower part of the panels are connected with fasteners to a base that in turn is connected to a floor.

23 Claims, 10 Drawing Sheets

PROTECTIVE SHELTER

FIELD OF THE INVENTION

The present invention relates in general to shelters to protect people from building collapse or other structural failures and from flying missiles and other damage resulting from natural disasters such as hurricanes, tornadoes, earth quakes, and thunderstorms, and from other disasters such as explosions and vehicle collisions. In particular, the present invention relates to stand-alone, above-ground storm shelters which are constructed from metal plating and that can be assembled in existing houses, can be installed in houses being built, and can also be constructed as stand-alone structures.

DESCRIPTION OF THE PRIOR ART

The Federal Emergency Management Agency (FEMA) has established criteria for in-residence shelters to protect the inhabitants of buildings from natural disasters. These shelters are "to provide a high degree of occupant protection during severe windstorms (hurricanes and tornadoes)." In-Residence Shelter, October, 1998. This FEMA publication provides construction plans and drawings for several different types of shelters including an in-ground shelter, a basement lean-to, a corner location basement shelter, a Concrete Masonry Unit (CMU), a CMU/concrete shelter, and a wood-frame shelter with plywood sheathing or steel wall sheathing.

There is also a recently published pamphlet sponsored by FEMA and written by the Wind Engineering Research Center of Texas Tech University entitled, "Taking Shelter From the Storm: Building a Safe Room Inside Your House" (First Ed., October 1998), listed as publication FEMA 320 entitled. This publication states that the basis of the design of a shelter "is to provide a space where you and your family can survive a tornado or hurricane with little or no injury . . . To protect the occupants during extreme windstorms, the shelter must be adequately anchored to the house foundation to resist overturning and uplift. The connections between all parts of the shelter must be strong enough to resist failure, and the walls, roof, and door must resist penetration by windborne missiles." However, the pamphlet goes on to state that extensive testing has shown that "walls, ceilings, and doors commonly used in house construction cannot withstand the impact of missiles carried by extreme winds." The publication then describes shelter designs that meet the design criteria.

All of the shelters in the FEMA publication involve permanent construction using concrete as the primary material or as the foundation material. The installation of these shelters thus cannot be done by the average homeowner and requires the use of a professional builder. For example, the wall construction recommended for a typical frame shelter plan with plywood and steel wall sheathing includes two layers of three-quarter inch plywood panels on the outside, a 14 gage steel sheathing on the inside and double 2×4 studs at 16 inches on center.

FEMA shelters have the following design criteria: they will withstand wind pressures developed from 250-MPH, 3-second gust in accordance with ASCE 7-95; they will withstand windborne debris (missile) impact loads created by a 15 pound 2×4 traveling horizontally along the board's longitudinal axis at 100 mph, traveling vertically at 67 mph, and impacting perpendicular to the wall surface. This missile speed corresponds to a 250 mph wind. The tornado missile test criteria was established by the Wind Engineering Research Center (WERC) at the Texas Tech University.

Other design criteria which has been set by FEMA for in-ground shelters includes that it has inside space for an in-ground shelter of a minimum of five square feet per person.

The shelter design criteria have contradictory requirements: on the one hand the shelters must be physically strong so that they can withstand high wind and earthquake forces; and on the other hand, the shelters must also be able to withstand the penetration of wind borne articles. If the shelter is constructed pursuant to the plans in the aforementioned FEMA publication, it can easily meet both of these contradictory criteria. However, such a shelter must be constructed by a professional building contractor that has a number of different professional workers, each with one of the requisite construction skills such as masonry, carpentry, and iron work.

There are many U.S. patents which disclose many varieties of shelters. Invariably, all of these shelters have the primary goal of providing structural integrity and protecting against collapse, ignoring the protection against the penetration of wind borne articles. One recently issued Wailer, U.S. Pat. No. 5,813,174, incorporated herein by reference, discloses a light-weight steel structure that can be packaged and shipped as loose tubular and bent-plate channel modules and can be assembled by the user. The patent disclosure states that this structure can be assembled entirely from inside the structure as it is being built and thus can be installed in an existing enclosure. It appears that an embodiment of this patent is presently being marketed by the Remagen Corporation of Monteagle, Tenn. However, the whole intent of this patent is to produce a structure comprised of a plurality of metal panels bolted together so as to produce extremely rigid walls that provide a solid enclosure. The construction features set forth in this patent clearly describe an I-beam configuration between adjacent panels that are connected to a rigid frame. For example, FIG. 5 of the patent discloses a rigid frame that is comprised of square, hollow steel tubes that defines the parallelepiped shape of the structure. Each end of each wall panel has a rigid metal cap at each end that is rigidly connected to the frame to provide increased rigidity.

The difficulty with such a very rigid and solid structure is that it will not pass the FEMA penetration test simply because it is too rigid. They are designed to protect against building collapse. There is virtually no "give " or "play " in the walls, and thus no means for absorbing and distributing the striking force of a propelled object, such as a 2×4 beam traveling at over 100 miles per hour. As stated in the publication FEMA 320, at page 12:

Damage can also be caused by flying debris (referred to as windborne missiles). If wind speeds are high enough, missiles can be thrown at a building with enough force to penetrate windows, walls, or the roof . . . Even a reinforced masonry wall will be penetrated unless it has been designed and constructed to resist debris impact during extreme winds. Because missiles can severely damage and even penetrate walls and roofs, they threaten not only buildings but the occupants as well.

Thus, there is a need for a shelter that will not only meet the aforesaid contradictory FEMA criteria, but also can be assembled by the consumer without the need for professional builders. There is also a need for a shelter that can be constructed in a reasonable period of time in an existing inhabited building without causing too much disruption. In addition, there is a need for such a shelter that can be economically purchased and easily assembled with only common hand tools. Thus it is clear that there is a long felt, well recognized need for a personnel shelter that can be economically assembled by relatively unskilled workers, in fact by a single consumer, from prefabricated components with readily available hand tools in a short period of time, and still when assembled can pass both the structural integrity tests and the missile penetration tests.

SUMMARY OF THE INVENTION

One of the key features of the present invention is the finding that a lightweight prefabricated structure (prefab) can meet both the structural strength and penetration tests only if its walls are designed to absorb and dissipate the energy from high speed missile impacts. Such an invention satisfies all of the aforesaid needs. It not only passed the penetration test of one missile, it passed the penetration test of three, subsequently fired missiles. It is economical to manufacture and purchase. It can be easily shipped in a plurality of modules and assembled by the consumer using readily available tools.

The present invention provides a modular, above-ground protective shelter designed to be used by the occupants as a protective refuge to protect them against injury from structural failure and/or flying missiles resulting form disasters such as tornadoes, severe thunderstorms, hurricanes, earth quakes, explosions, etc. It has the advantages that it can be obtained in a partially prefabricated form or in disassembled packages that can be readily assembled and easily retrofitted into existing buildings or installed in new construction buildings. The present invention utilizes diaphragm construction and has individual components that are sized so that they can be handled and installed by one person who need not be highly skilled or a professional. The present shelter is made from materials that have the strength to meet the design load criteria such as FRP, steel, high strength steel, aluminum, kevlar, carbon fiber, etc, or a combination of two or more of them.

According to one embodiment of the present invention, the shelter is comprised of a base, four walls supported on the base, and a roof supported by the four walls such that the four walls and roof define an interior space. Each wall is comprised of a plurality of elongate panels that have a top end, a bottom end and parallel sides, each panel being connected only at the sides thereof to a corresponding side of an adjacent panel, at the top to said roof, and at the bottom to the base so as to form a diaphragm. Each panel has a channel shape with a "c" shaped cross section and is comprised of an elongate web portion having side edges and two integral flange portions that extend into said interior space and terminate at inward edges. A plurality of longitudinally spaced, mechanical fasteners extend through adjacent flange portions of adjacent panels near the inward edges thereof so that the outward portions can flex apart.

While the present invention utilizes similar materials that are used in the aforementioned Waller patent, the materials are connected together in an entirely different way in the present invention so as to provide a diaphragm type design that distributes the collapsing forces of the wind to the adjacent walls, on the one hand, and absorbs the kinetic energy of the missile through the controlled deformation of both the struck panel and the adjacent panels, on the other hand, resulting in a structure that both prevents the penetration of wind borne missiles and withstands the collapsing forces of wind storms. Thus, the particular construction design of a structure that can both repel missiles and withstand collapsing forces is very important, but according to experts in the field, is not deducible from the prior art. As stated in a writing entitled, "Considerations in Designing Above-Ground Storm Shelters," from the Wind Engineering Research Center (WERC) of Texas Tech University, which is the author of FEMA 320 publication:

Structural analysis and design are sufficiently mature to permit analytical approaches to be used to assure structural integrity of shelters when subjected to wind-induced forces. On the other hand, the resistance to perforation of common residential building components by wind-borne debris does not lend itself to analytical solution. Performance testing seems necessary to assure reliability.

Building a strong rigid structure with relatively light material is easy. However, because the elastic curve of steel under high velocity impact is markedly different than from static loading and the capacity of steel to absorb energy without rupture is considerably less than under impact at moderate speeds, resisting penetration from high velocity impact with relatively light material is difficult. The structure must be designed and constructed so that there is enough give at impact to initiate deformation. The combination of "give" and controlled deformation allow the structure to prevent penetration.

The present invention satisfies a number of design criteria to obtain its above listed objects and features, which criteria is not obvious from the prior art. Together these criteria include: a shelter that is comprised of components that can be handled by a single person and can be installed by a single person using only hand tools and the contradictory criteria that such a shelter will provide protection from the tremendous forces and prevent penetration by flying missiles; a shelter that has a retail cost that is far below the costs of contemporary designs; a shelter that can accommodate a family; a shelter that can be prefabricated; a shelter that can be manufactured in one part of the country and easily and economically shipped to the locations where it is needed; and a shelter which if damaged can be easily and economically repaired. The present invention meets all of these design criteria.

However, there are other features, advantages and benefits of the present invention, and they together with those listed above will be set forth in or obvious from the detailed description of the invention hereinbelow.

DETAILED DESCRIPTION OF THE PREFERRED EMBODIMENTS

Figure 1:
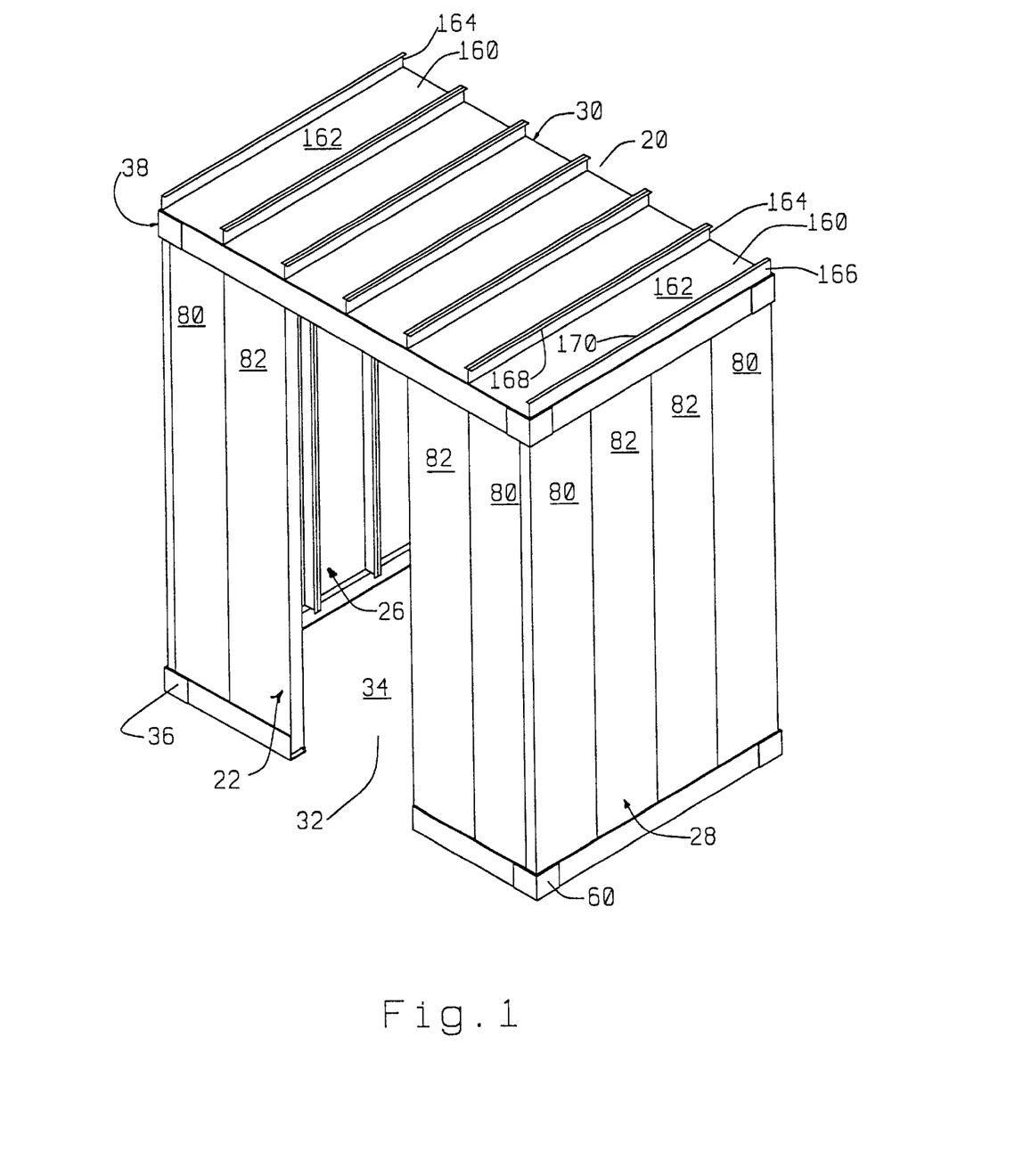
FIG. 1 is perspective view of a protective shelter according to the present invention with some parts removed for clarity.
Figure 2:
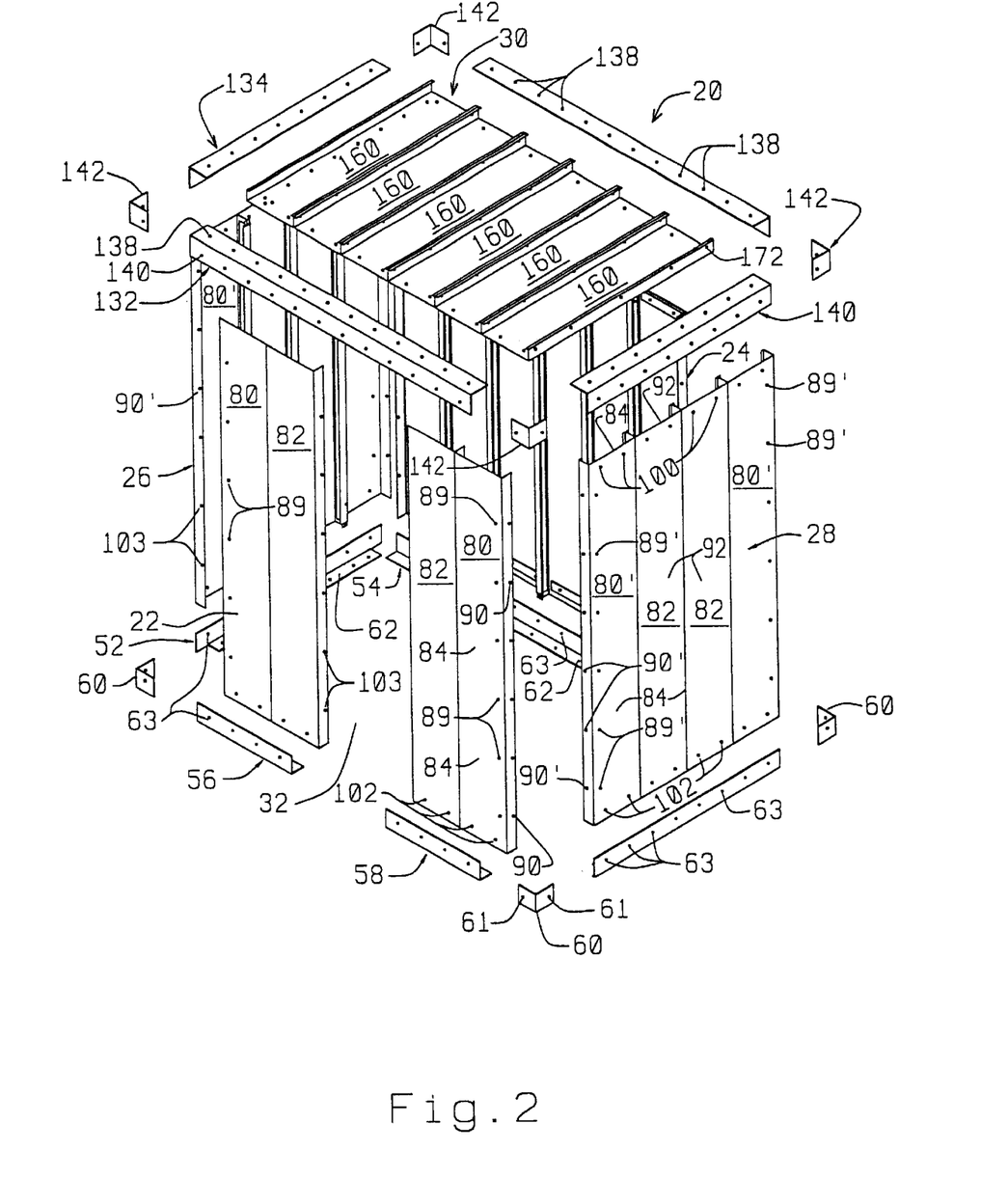
FIG. 2 is an exploded view of the shelter depicted in FIG. 1 in which the location of bolt holes are shown, but the mechanical fasteners are not shown.
Figure 3:
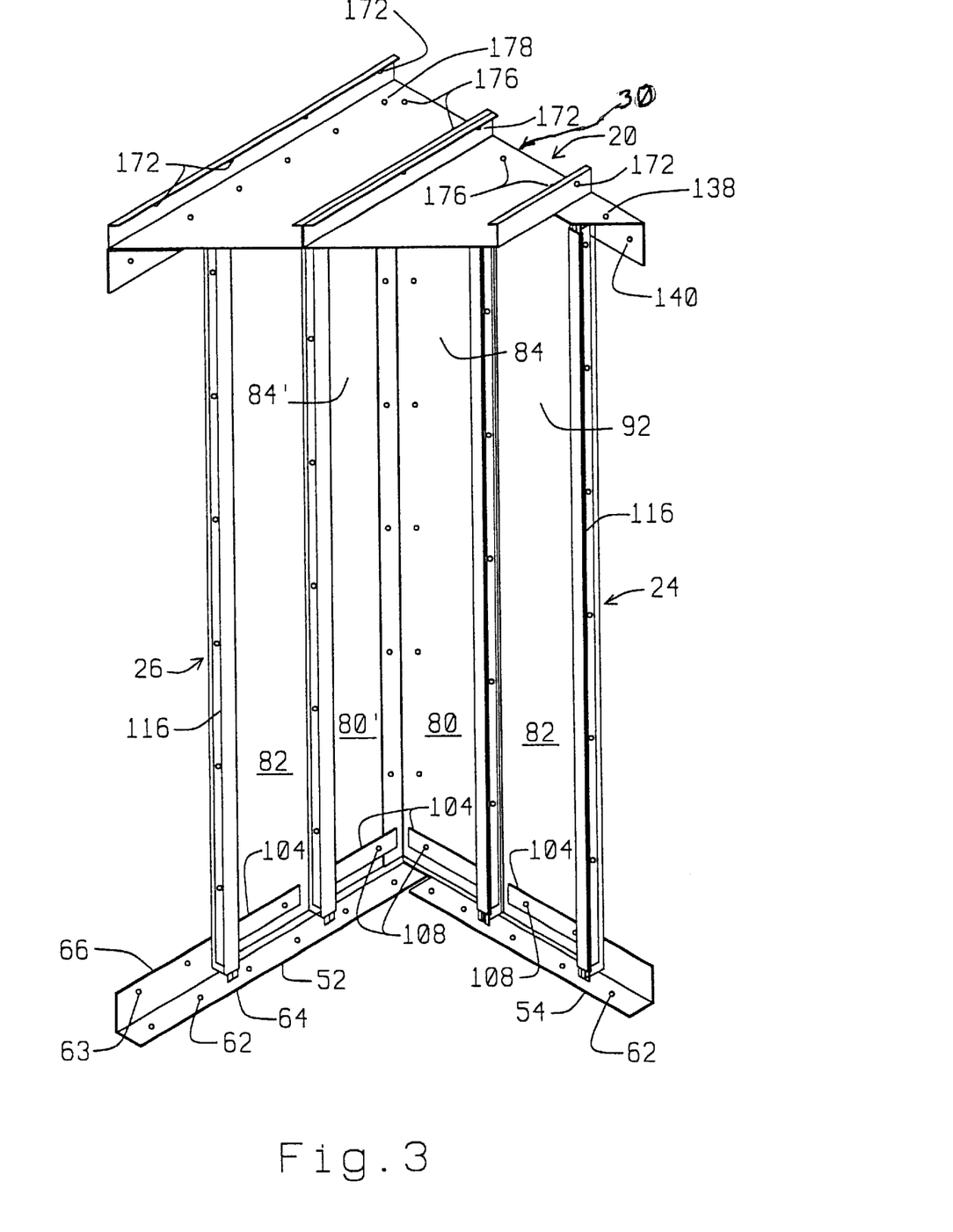
FIG. 3 is an enlarged perspective view, with parts removed, of an inside corner of the shelter.

With reference now to the drawings in which like elements are denoted with the same numeral throughout the several views, and in particular with reference to FIGS. 1, 2 and 3, a protective shelter 20 is depicted. Shelter 20 is comprised of a front wall 22, a back wall 24, a left side wall 26 and a right side wall 28 as seen in FIG. 1, and a roof 30. Front wall 22 has an opening 32 through which entry into shelter 20 can be obtained. Shelter 20 rests or sits on a floor 34 (see also FIG. 13), which if shelter 20, as is usual, is installed in a house or other building, would most likely be a cement slab or cement basement floor. Of course, floor 34 could also be a wood floor, a marble floor, or a floor of any conventional building material. Walls 22, 24, 26 and 28 are rigidly attached at their bottom end to floor 34 with a base 36, and are rigidly attached at their top end to roof 30 with a cap 38, as described hereinbelow.

In a preferred embodiment, shelter 20 is a parallelepiped having a height of about 6 feet, 8 inches and a room size of 4 feet by 6 feet or 6 feet by 8 feet. Based on a recommended FEMA standard of 5 square feet per person, a 4×6 shelter can accommodate 4 or 5 persons and a 6×8 shelter can accommodate 9 or 10 persons.

Shelter 20 is provided with a conventional door frame (not shown) in opening 32 and a conventional door (also not shown). Alternatively, shelter 20 could be comprised of a structure that has all walls continuous without any entrance ways therethrough and access is gained through either a trap door in the roof or through the floor. It is noted that the FEMA missile test criteria is about two-thirds that of the walls, so in some circumstances it could make sense to put shelter 20 in a basement or dugout under the house and have access through a trap door in the ground floor of the house.

Preferably, shelter 20 is constructed of relatively lightweight, but very strong construction material. Accordingly, the preferred material of today is conventional steel plates that have been formed into the shapes of panels, as seen in FIG. 3, and as more fully described hereinbelow. Other materials, perhaps such as plastics or combination materials (e.g. plastics and metals) would be known to those skilled in the art, and would be acceptable so long as they conformed to the FEMA requirements or so long as they passed the FEMA test criteria.

Figure 4:
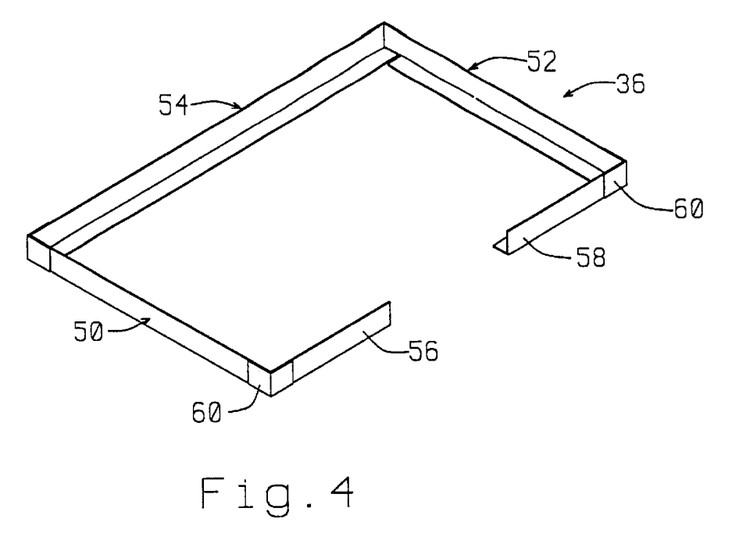
FIG. 4 is a perspective view of an assembled base, with some parts not being shown.
Figure 5:
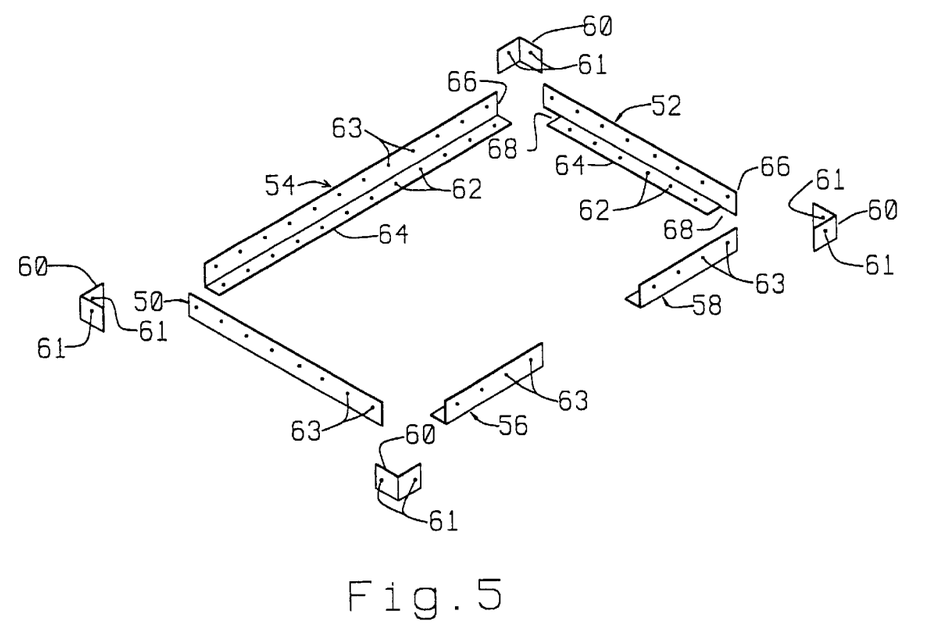
FIG. 5 is an exploded, perspective view of the base.

With reference now to FIGS. 2, 4 and 5, base 36 is comprised of five angle iron members, two side members 50 and 52, a back member 54 and two substantially identical front members 56 and 58. Base 36 also includes four substantially identical corner plates 60 that cover adjacent members, each corner plate being a bent sheet of steel in an L-shape in the vertical direction and having through-holes 61 for receiving fasteners (not shown) to make a rigid connection. In a preferred embodiment, each angle iron member 50, 52, 54, 56, and 58, is of conventional construction steel of 11 gage to 5/16 inch thick, bent plate steel and has a plurality of through-holes 62 in a horizontal leg 64 of from 2½ inches to 5 inches in width, and a plurality of holes 63 in a vertical leg 66 of 2½ to 5 inches in width. Holes 61 and 62 are for receiving a fastener, such as a nut and a bolt (not depicted in FIGS. 2, 4 and 5). Side members 50 and 52 have a shorter horizontal leg 64', the edges of which are spaced from end of the member by a distance substantially equal to the width of the horizontal legs of back and front members 54 and 56, as shown in FIG. 4. This results in a square cutout 68, assuming that the horizontal legs 64 of each member have the same width. Preferred dimensions of all 5 angle iron members is a height of 4 inches, a base length of 3 inches and a thickness of 3/16 inches. Hole 62 in horizontal leg 64 is spaced 1¾ inches from the back of horizontal leg 64 and hole 63 in vertical leg 66 is spaced 2½ inches from the bottom of vertical leg 66. Cover plates 60 perform no structural function but cover the gap between the ends of the angle iron members.

Figure 13:
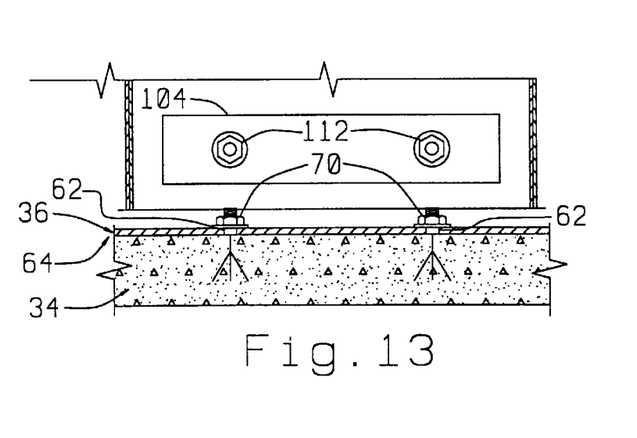
FIG. 13 is an enlarged, front elevational, inside view, taken in cross-section, of a panel connected to the base.
Figure 14:
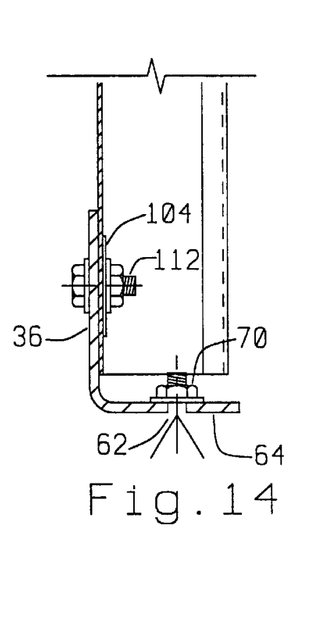
FIG. 14 is an enlarged, cross sectional, side elevational view, taken in cross-section, of a panel connection to the base.

As shown in FIGS. 13 and 14, hole 62 in horizontal leg 64 of base 36 is for receiving a fastener 70. Fastener 70 is of the conventional type that can be used in concrete, assuming floor 34 is a slab. Such conventional fasteners include an embedded bolt, bolts and an expansion anchor, adhesive anchors, drop in anchors, sleeve anchors, power actuated fastener, and the preferred quick bolt.

Each wall is comprised of substantially identical elongate end panels 80 and substantially identical elongate, middle panels 82, as shown in FIGS. 1, 2 and 3, and 6 and 7. Panels 80 and 82 are commercially available steel panels having a generally channel or "c" shape. All of the walls preferably have identical end panels 80 and middle panels 82 so as to reduce the number of different parts, permit part interchangeability, reduce costs, and make assembly easier. Panels 80 and 82 are much wider than the panels depicted in the aforesaid Waller patent with the result that each panel is more flexible. A typical width of the panels in the Waller patent is 8 inches in order to provide increased strength and rigidity, whereas the width in the present application is about one foot, but it could be from about 10 inches to as large as about 26 inches, so that the diaphragm effect is enhanced and a controlled deformation is permitted.

Figure 6:
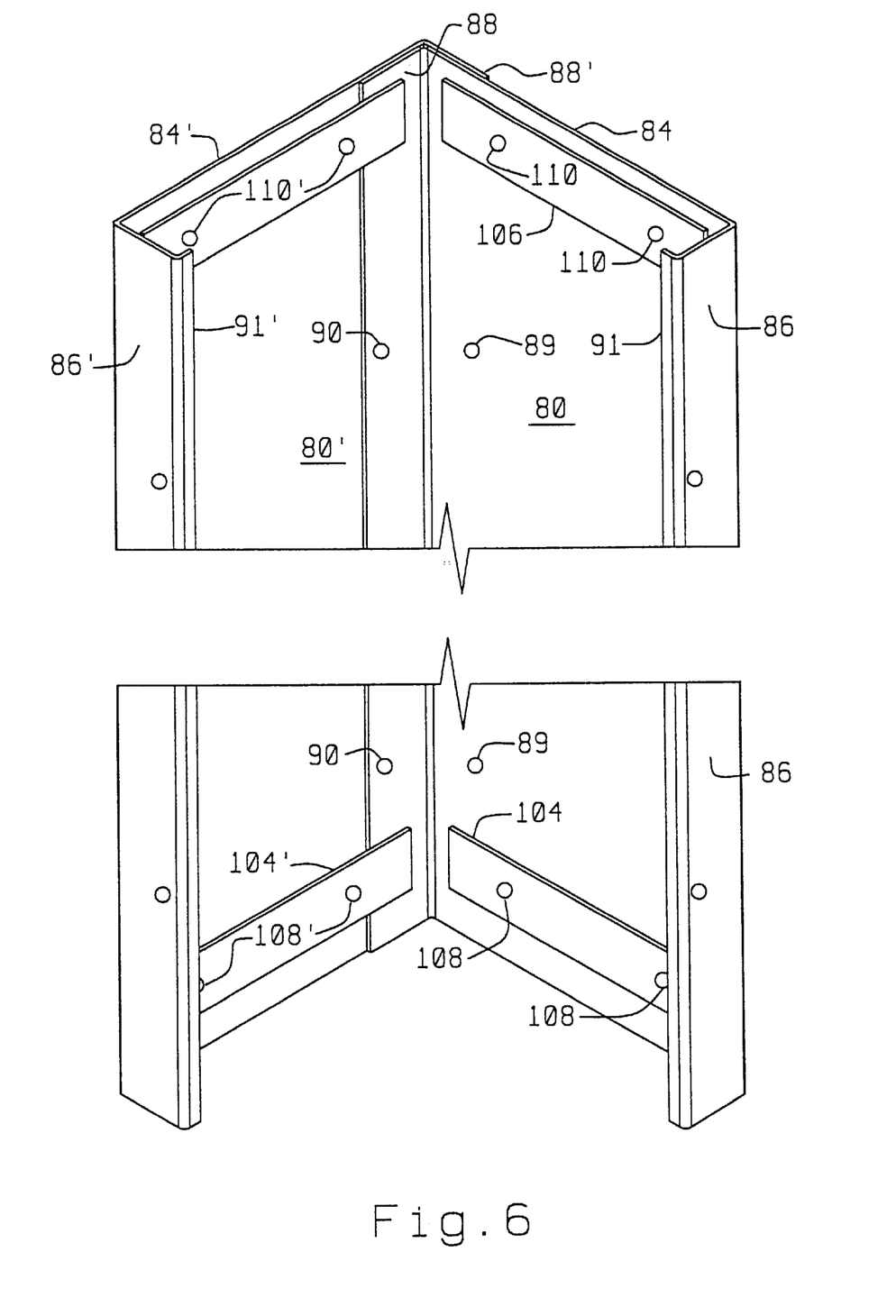
FIG. 6 is a perspective view of two corner panels, with some parts removed, and with the edges enlarged to show details.

End panels 80 and 80' as shown in FIG. 6, are respectively comprised of interior web portions 84 and 84' and two similar side portions 86 and 86' and 88 and 88' that extend perpendicularly to and are integral with web portions 84 and 84'. End panel 80' is oriented so that side portion 88' is the outward portion and can overlap corresponding side portion 88 of end panel 80, as seen in FIG. 6. As also shown in FIG. 2, the sides of web portions 84 and 84 that are closest to side portions 88 and 88', respectively, have a plurality of vertically aligned through-holes 89 and 89' and the corresponding side portions 88 and 88' have corresponding vertically aligned through-holes 90 and 90'. Fasteners, such as nuts and cap bolts (not shown), can extend through corresponding through-holes 89 and 90 and 89' and 90' and can respectively rigidly attach end portions 88 and 88' to web portions 84' and 84. Side portions 86 and 86' have integral return portions 91 and 91' that extend perpendicularly to their respective side portions 86 and 86', and hence parallel to web portions 84 and 84'. Typical dimensions of web portion 84 are from 10 inches to 26 inches, of side portions are from 2 inches to 8 inches, and of return portion 91 are from 0.5 inches to 2.5 inches. The presently preferred dimensions of end panels 80 are a web portion 84 having a width of 12 inches, a side portion 86 having a width of 2½ inches, and a return portion 91 having a width of ⅝ inches. The length of end panel 80 varies depending upon the desired height of shelter 20, but the presently preferred height is about 6 feet, 8 inches. The range of preferred gages of end panels 80 are from 9 to 14 with a presently preferred gage of 12. Such a panel has a yield strength of between 22 KSI to 72 KSI, depending primarily on the gage.

Figure 7:
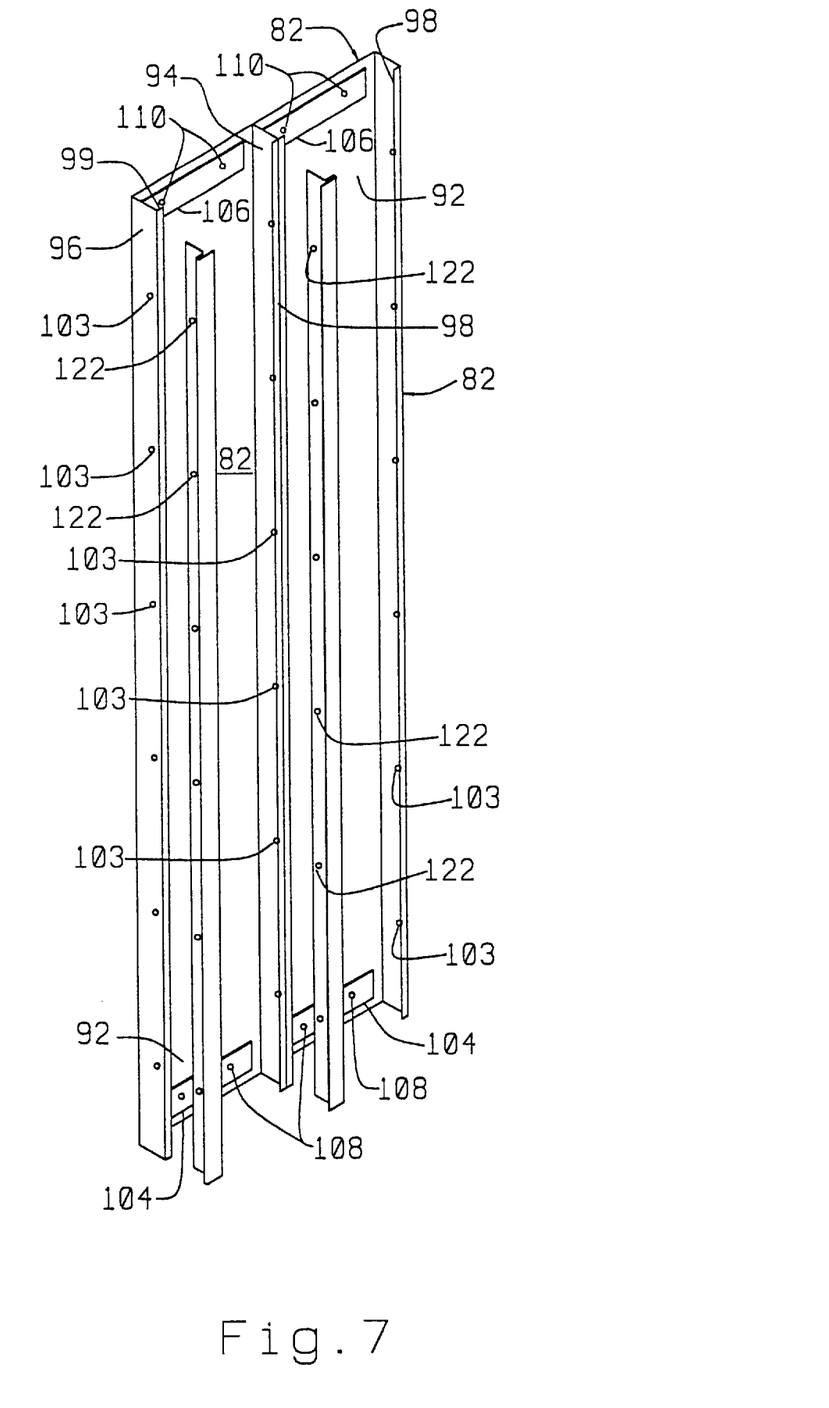
FIG. 7 is a perspective view of two adjacent middle panels with a connecting cap shown exploded and with some parts removed for clarity.

Middle panels 82, shown in FIG. 7 are substantially the same as end panels 80, having a web portion 92, two side portions 94 and 96, and a return portion 98 integral with side portion 94, but also having a second return portion 99 integral with side portion 96. While the dimensions of web portions 84 and 92 can be different for the same structure, in a presently preferred embodiment they are the same. In any case, the dimensions of all four side portions are the same.

As depicted in FIG. 2, each end panel web portion 84 and each middle panel web portion 92 has two through holes 100 in a top portion thereof and two through holes 102 in a bottom portion thereof, each for receiving an appropriate fastener to fasten the corresponding panel to cap 38 and base 36, respectively, as described hereinbelow. In addition, each side portion has a plurality of vertically spaced through holes 103. Through holes 103 are spaced about 13 inches from each other and about 7½ inches from each end. This spacing has been found to provide an excellent compromise between cost, weight and ease of assembly on the one hand and integrity against joint separation upon impact of a wind borne missile.

Figure 11:
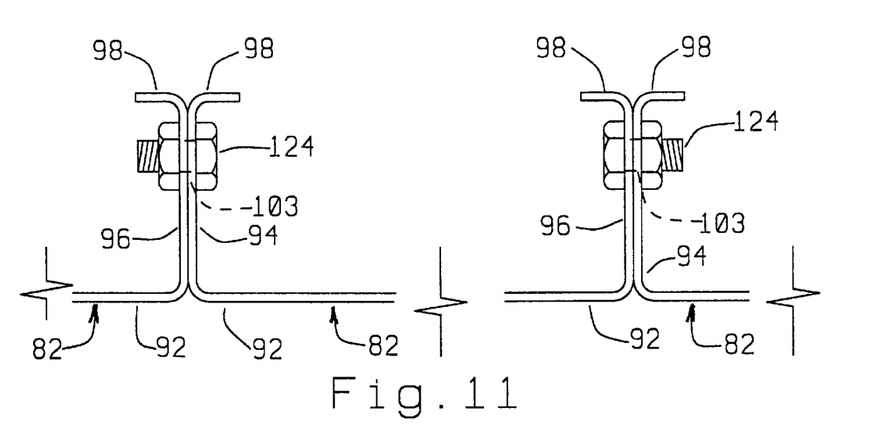
FIG. 11 is an enlarged top plan view, with parts removed for clarity of two pairs of adjacent panels showing the location of the connecting bolt.

The location of through-holes 103 in middle panel 82 from return portion 98 and from web portion 92 is critical to the design of shelter 20. As seen in FIG. 11, in which connecting cap 116 has been removed, holes 103 have a fastener 124 therethrough to connect adjacent panels 82 together. Holes 103 and fasteners 124 are horizontally located a distance "a" from return portions 98 such that they are closer to return portions 98 than to the surface of web portion 92. Preferably, fasteners 124 are wholly located in the inward most half section of side portions 94, that is the vertically extending half section of the corresponding side portion that is closest to the inner space enclosed by shelter 20. In this way, should a panel be struck by a projectile or missile, adjacent panels 82 can allow the controlled deformation of both the struck panel and the adjacent panels. Stated another way, adjacent ones of panels 82 form a diaphragm pair such that energy from a striking missile or projectile can dissipate over the diaphragm pair and the diaphragm pair can partially separate from each other and thereby provide a yielding surface and thus be able to resist penetration of the missile or projectile therethrough.

If, as in conventional connections, fastener 124 is located midway or closer to the web portion 92, the connection between adjacent panels would provide the strength of an I-beam and would not have the requisite deflection. The result is a surface that can be easily penetrated by a 15 pound 2×4 wood beam traveling horizontally at the design speed of at least 100 miles per hour.

Vertical leg 66 of base 36 is located on the outside of the bottom of panels 80 and 82 so that greater protection is provided against penetration should a missile or projectile strike a direct blow at the base of shelter 20. Mounted on the inside surface of each end panel 80 and each middle panel 82 is a bottom backing plate 104 and a top backing plate 106 with respective through holes 108 and 110. Backing plate holes 108 and 110 correspond to panel holes 100 and 102, respectively, and fasteners 112 and 114, not shown in FIG. 2, but shown in FIGS. 12,13 and 14, respectively, connect backing plates 104 and 106 to the bottom and top of the corresponding panels and base 36 and cap 38 together.

Backing plates 104 and 106 are substantially the same and comprise a rectangular piece of flat steel having a thickness of from 9 gage to 14 gage, with a presently preferred thickness being 12 gage. Backing plates 104 and 106 provide increased strength at the connecting panel holes and help prevent the bolts from pulling through as a result of the disassembling forces from an impacting object. Washers (not shown) are also used between the head of the fastening bolt and the backing plate 104 or 106 and prevent the bolt from being pulled through the backing plate and they can bend and thus can absorb some of the energy from a striking missile.

Fasteners 112 and 114, and in fact all fasteners included in the present invention, are nuts and bolts that can be installed with only two properly sized wrenches. The preferable type of bolts is conventionally known as cap screws and for fasteners 112 and 114, half-inch cap screws are used. Obviously, other fasteners could be used, such as rivets, screws, self-tapping screws, and the like. In fact, spot welding and adhesives are also contemplated under the definition of fasteners. However, nuts and bolts currently have the advantages that they are readily available, specifications of them are well known, they are relatively inexpensive, quite strong, relatively fast to install, and can be installed by the consumer without the necessity for special training or special tools such as required for welding or rivets.

Figure 8:
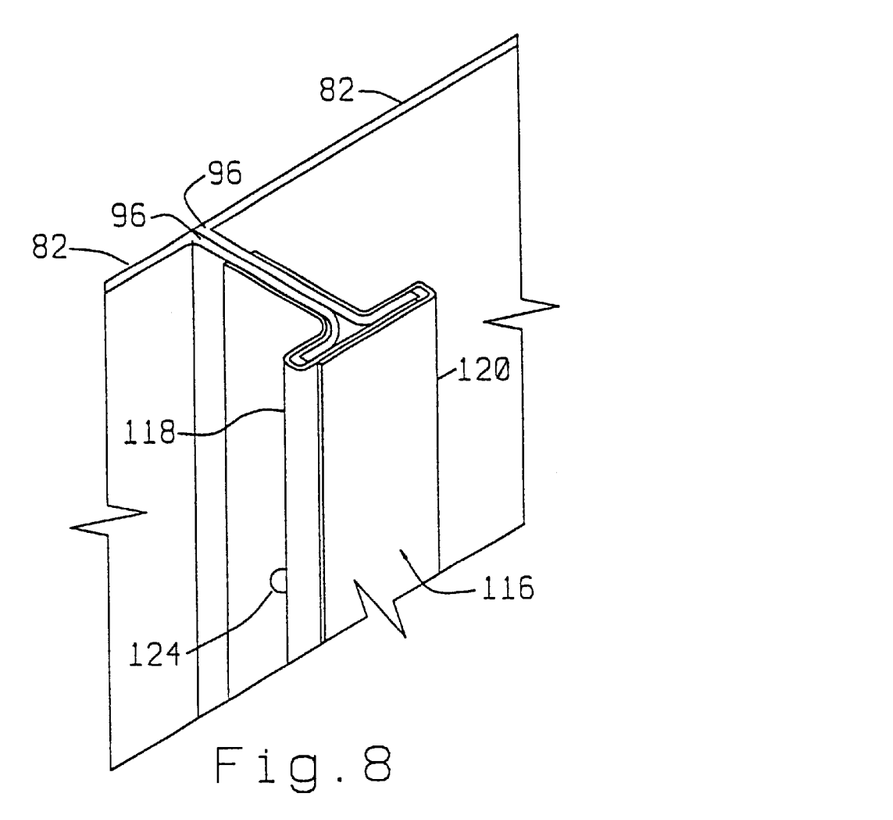
FIG. 8 is an enlarged, partial perspective top view of two assembled panels with an installed connecting cap.

With reference in particular to FIGS. 7 and 8, a connecting cap 116 comprised of a shaped male part 118 and a corresponding, shaped female part 120 fits around panel side portions 96 and return portions 98, and has a plurality of vertically aligned through holes 122 which correspond to vertical holes 103 in panels 82. Connecting cap parts 118 and 120 are rigidly held in placed or attached to side portions 96 of adjacent panels 82 with a plurality of fasteners 124. Fasteners 124 extend through corresponding ones of vertical holes 103 and 122, and are preferably conventional nuts and ⅜ inch bolts known as cap screws. Connecting cap parts 118 and 120 are preferably made from 16 gage bent steel and connecting cap tend to keep middle panels 82 together at their mutual butting edges when shelter 20 is subjected to the tearing forces from projected missiles. In addition they serve as backing plates for the attachment fasteners 124 to retard their being pulled out. Also, the strengthening forces applied by connecting cap 116 are applied to the inward edges of panels 82 so that the diaphragm effect is maintained, and perhaps enhanced.

Figure 9:
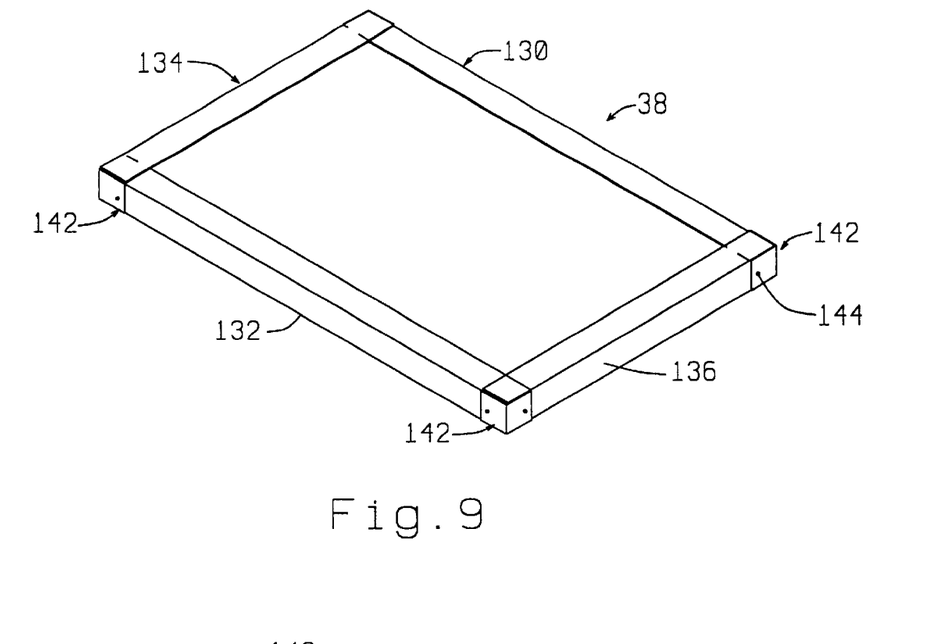
FIG. 9 is a perspective view of an assembled cap.
Figure 10:
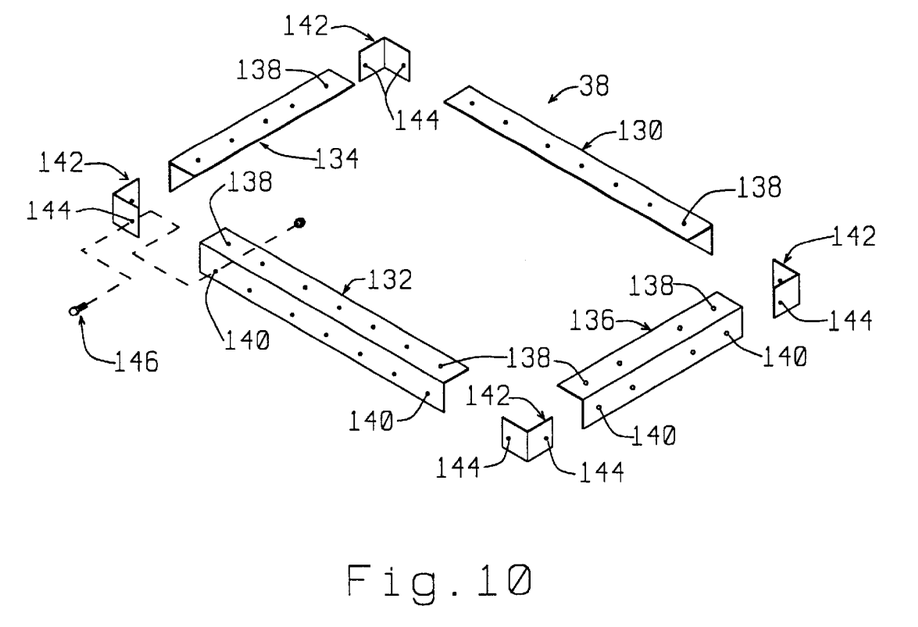
FIG. 10 is an exploded, perspective view of the cap.

With reference now to FIGS. 9 and 10, cap 38 is depicted in greater detail. Cap 38 is comprised of two side angle iron members 130 and 132 and two end angle iron members 134 and 136, each of which have a plurality of through-holes 138 and 140 therein in the horizontal and the vertical portions, respectively. As shown in FIG. 9, end members 134 and 136 are located on top of side members 130 and 132 and together form a rectangular annulus. The ends of adjacent ones of members 130, 132, 134 and 136 are covered with vertically oriented 1shaped covers 142 which have through-holes 144 therein. Covers 142 perform no structural function but cover the gap between the ends of the angle iron members. A plurality of fasteners 146 (only one of which is depicted) extend through the corresponding holes 144 of covers 142 and the endmost holes 140 in each member 130, 132, 134 and 136. Fasteners 146 are preferably ½ inch cap screws with corresponding nuts. As shown in FIG. 9, covers 142 are mounted on the outside surface of the vertical portion of members 130, 132, 134 and 136. Preferably, angle iron members 130, 132, 134 and 136 are made of 3/16 inch steel and have a horizontal portion that is 4½ inches wide and a vertical portion that is 5 inches high.

Figure 12:
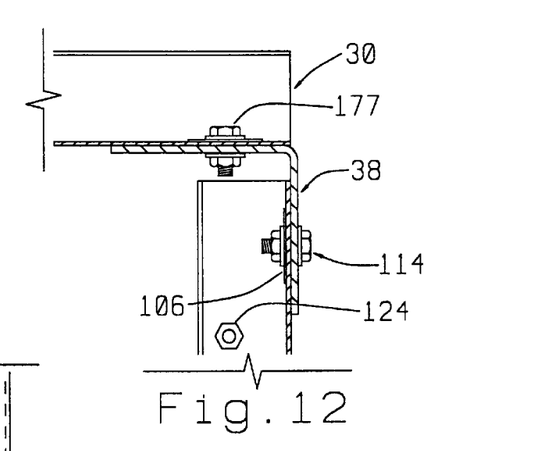
FIG. 12 is an enlarged side elevational view, taken in cross-section, of a roof panel connected to a side panel.

Roof 30 is depicted in FIGS. 1, 2 and 3, and is comprised of a plurality of panels 160 that are identical with middle panels 82 except for their lengths. Thus panels 160 are comprised of a web portion 162, two side portions 164 and 166 integral with web portion 162, and two return portions 168 and 170 integral respectively with side portions 164 and 166. Each side portion 164 and 166, unlike side portions 94 and 96 of panels 82 which face inwardly toward the center of shelter 20, face upwardly and in a direction outwardly from the interior of shelter 20. As shown in FIG. 3, each panel has a plurality of aligned through-holes 172 in side portions 164 and 166 for receiving fasteners 174 to connect adjacent panels 160 together. Also, each end of web portion 162 of panels 160 is provided with a pair of through-holes 176 that correspond to holes 138 in cap 38 so that cap 38 is rigidly connected to roof 30 with a plurality of fasteners 177, one of which is shown in FIG. 12. The web portions 162 in the outermost ones of roof panels 160 is also provided with a row of through-holes 178 which correspond to holes 138 in side members 130 and 132. Roof panels 160 are oriented with the side portions thereof pointing upwardly so that it will be easier to assemble them together.

Figure 15:
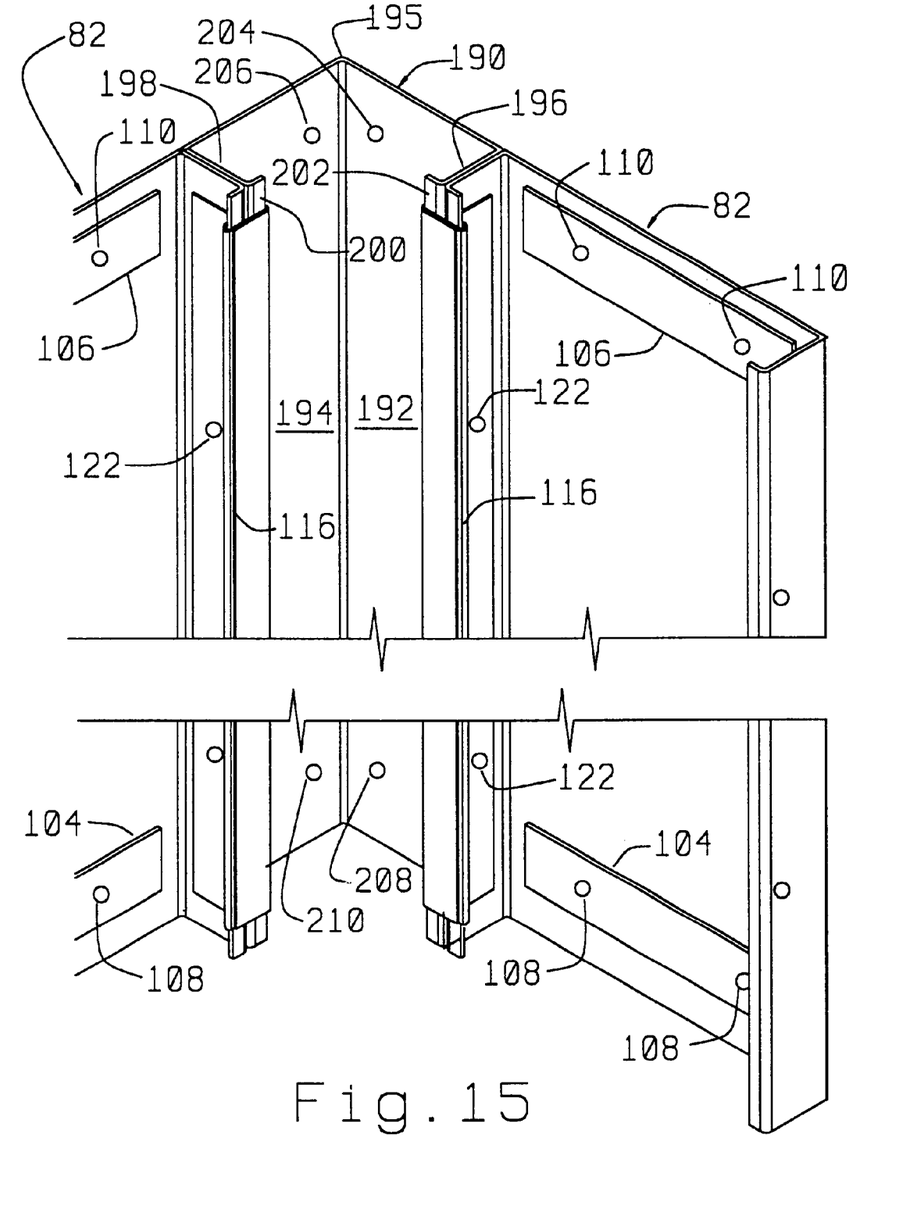
FIG. 15 is a perspective view of a second embodiment of the present invention in which a single shaped, corner member replaces the end panels of adjacent walls.

A modification of shelter 20 is depicted in FIG. 15 in which end panels 80 are replaced by a corner panel 190 that is connected to two adjacent middle panels 82. Corner panel 190 is preferably made from a single sheet of bent or shaped 12 gage steel and is comprised of a first and a second web portion 192 and 194 that are integrally connected together at their adjacent vertical edges to form a corner 195 of shelter 20. Two side portions 196 and 198 are integrally connected to the other vertical edges of web portions 192 and 194, respectively, along an outer vertical edge and along the inner vertical edge have return portions 200 and 202 integrally connected thereto. Connecting caps 116, as described above, connect adjacent middle panels 82 to corresponding sides of corner panel 190. Two pairs of through-holes 204 and 206 (only one of which is depicted in FIG. 15) in each web portion 192 and 194 at the respective top sections thereof and two pairs of through-holes 208 and 210 (only one of which is depicted in FIG. 15) at the respective bottom sections thereof permit fasteners to connect corner panel 190 to cap 38 and base 36, respectively. A preferable width of web portions 192 and 194 is six inches.

Although not depicted in these figures, a conventional door jam and door can be installed in opening 32. In order to promote modular construction, the width of opening 32 is an integral number times the width of panels 82. Thus, as shown in FIG. 1, the width of opening 32 is 24 inches, the width of two panels 82.

Figure 16:
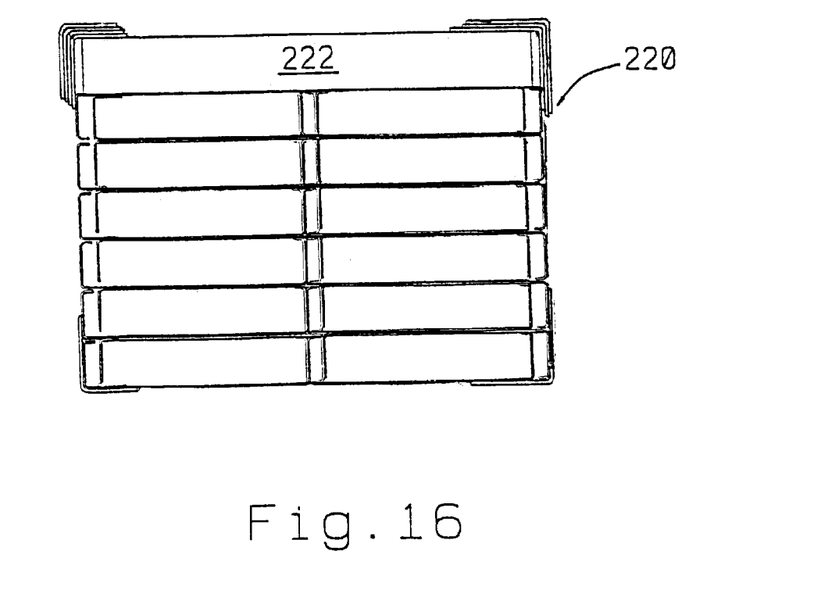
FIG. 16 is an end elevational view of a kit of structural components used to build a protective shelter according to the present invention in which the unassembled components are stacked for shipment in a presently preferred arrangement.

FIG. 16 depicts an end view of a preferred shipping bundle 220 containing all of the parts of shelter 20. Such a bundle has 7 layers and will weigh about 1500 pounds for components having the preferred dimensions stated above. Each of the lower five layers are comprised of four panels 80 and 82 per layer and the sixth layer is comprised of the shorter six roof panels 160. The top layer is diagrammatically shown as a box 222 which represents a container that contains the door components. The various angle irons that make up base 36 and cap 38 are clearly depicted as being located around the appropriate corners thereof.

A shelter 20 according to the present invention can be assembled by a non-skilled consumer as follows. First base 36 is rigidly mounted to floor 34 using appropriate fasteners. Next, the corners of shelter 20 are made by installing two end panels 80 and two middle panels 82 and finger tightening the bottom fasteners to connect the bottoms of the panels to base 36. The side fasteners are then installed and finger tightened to connect the adjacent panels to one another. Then the cap side and end members 130, 132, 134 and 136 are placed on the outside top of the installed panels and fasteners are inserted through the aligned holes and finger tightened. Then the covers 142 of cap 38 are installed and the fasteners are again installed finger tight. Next, roof panels 160 are individually placed on top of cap horizontal leg and the appropriate fasteners are installed, again finger tight. Finally, the remaining middle panels 82 are inserted in place and connected to base 36 and cap 38, and to the already installed adjacent panels. Finally all of the fasteners are tightened using a wrench on each side and door jam and door can be installed in a conventional manner.

The invention being thus described, it will be obvious that the same may be varied in many ways. Such variations are not to be regarded as a departure from the spirit and scope of the invention and all such modifications are intended to be included with the scope of the claims as set forth hereinbelow.

I claim:
1. A prefabricated protective shelter which encloses an inner space, said shelter comprising
a front wall;
a rear wall;
two side walls;
wherein said walls are each comprised of a plurality of vertical C-shaped panels, each panel comprised of
a flexible front web portion, and
two inwardly extending side portions integral with said web portion and at least substantially perpendicular to said front web portion,
said side portions having an inwardly facing edge and an opposite outer edge integral with said web portion,
return portions integrally connected to corresponding inwardly facing edges of said side portions, said return portions extending at least substantially parallel to said web portion, and
a plurality of vertically space holes in said side portions, said holes each being located closer to said inwardly facing edge than said outer edge; and
first fasteners that securely connect adjacent ones of said panels by extending at least substantially parallel to said front web portion through corresponding ones of said vertically spaced holes such that adjacent ones of saidd panels from a diaphram pair such that energy from a striking projectile can dissipate over said diaphragm pair, a wall panel of said diaphragm pair can flexibly deform in response to being struck by the projectile and a joint between adjacent panels of said diaphragm pair can partially pivotally separate relative to each other so as to provide a yielding surface, said diaphragm pair thereby being able to resist penetration of the projectile therethrough.

2. A protective shelter as claimed in claim 1, wherein each side portion has an outward and an inward vertically extending half section, and wherein all of said vertically spaced holes are fully located in said inward half section.

3. A protective shelter as claimed in claim 2, wherein each wall has an end panel at each end thereof; and wherein adjacent end panels of adjacent walls are directly connected to each other.

4. A protective shelter as claimed in claim 2, and further including
a base connected to said walls; and
second fasteners that securely, rigidly attach said base to a supporting surface.

5. A protective shelter as claimed in claim 4, and further including a roof attached to each of said walls so as to define a fully enclosed interior space.

6. A protective shelter as claimed in claim 5, and further including a cap that connects said roof to each of said panels such that said roof is not directly connected to any of said walls.

7. A protective shelter as claimed in claim 6, wherein said front wall has a door opening therein that extends from said supporting surface to said cap.

8. A protective shelter as claimed in claim 1, wherein said front wall has a door opening therein;
and wherein said panels and said side portions are from one piece of shaped material.

9. A protective shelter as claimed in claim 1, wherein said shelter does not have any vertical frame members; and wherein said panels are made of steel.

10. A protective shelter as claimed in claim 1, and further including
a bottom frame; and
second fasteners that securely connect the bottoms of said panels to said bottom frame.

11. A protective shelter as claimed in claim 10, wherein each of said panels has two horizontally spaced apart bottom holes in a bottom section thereof and wherein said bottom frame has corresponding holes therethrough such that said second fasteners extend through said bottom holes and said bottom frame holes.

12. A protective shelter as claimed in claim 1, and further including
a bottom frame;
second fasteners that securely connect the bottoms of said panels to said bottom frame;
third fasteners that securely connect said bottom frame to a shelter supporting surface, such that said panels are not directly connected to said shelter supporting surface;
a roof attached to each of said walls so as to define a fully enclosed interior space;
a cap that connects said roof to each of said panels;
fourth fasteners that securely, rigidly attach a top portion of said panels to said cap; and
fifth fasteners that securely, rigidly attach said roof to said cap, such that said roof is not directly connected to any of said panels.

13. A protective shelter as claimed in claim 12, and further including a bottom backing plate located on the inward facing side of said panel at the bottom thereof, and said second fasteners connect said backing plate, said panel and said bottom frame such that said backing plate helps prevent the extraction of said second fasteners when said panel is struck by a striking projectile.

14. A protective shelter as claimed in claim 1, said protective shelter further comprising:
a connecting cap mounted over adjacent panel returns and only an inward section of adjacent side portions of said middle panels, said connecting cap comprised of a first cap portion and a second cap portion, each cap portion having a first section that overlaps a part of said panel side portion, an end section that overlaps said return, and a second section at least substantially perpendicular to said first section that extends beyond said side portion inwardly facing edge, said second section of said first cap portions overlapping said second section of said second cap portion, each cap first section having a second plurality of vertically spaced holes that correspond to said first plurality of vertically spaced holes;
said first fasteners extending through corresponding ones of said connecting cap second plurality of vertically spaced holes and connecting said cap portions and said adjacent panel side portions together.

15. A protective shelter as claimed in claim 1 wherein each of said walls is comprised of two end panels that are connected to the corresponding adjacent end panels of the adjacent wall and a plurality of middle panels; and wherein the width of each middle panel is from ten inches to twenty-six inches.

16. A protective shelter as claimed in claim 15 wherein the width of each middle panel is about twelve inches.

17. A protective shelter as claimed in claim 15 wherein the gage of each panel is from nine to fourteen.

18. A protective shelter as claimed in claim 17 wherein the gage of each panel is 12.

19. A protective shelter as claimed in claim 1 wherein the width of each panel web portion in each wall is the same.

20. A kit for building a protective shelter having four walls and a roof, said protective shelter comprising:
a plurality of first fasteners;
a plurality of second fasteners;
a plurality of third fasteners;
a first plurality of vertical C-shaped panels of equal length for building the four walls, each panel comprised of
a flexible front web portion, and
two inwardly extending side portions integral with said web portion and at least substantially perpendicular to said front web portion,
said side portions having an inwardly facing edge and an opposite outer edge integral with said web portion,
wherein at least some of said panels further comprise return portions integrally connected to corresponding inwardly facing edges of said side portions, said return portions extending at least substantially parallel to said web portion, and
a plurality of vertically spaced holes in said side portions, said holes each being located closer to said inwardly facing edge than said outer edge, and each said hole for receiving a first fastener at least substantially parallel to said front web portion so that two panels can be connected together in a butt joint;
a first plurality of elongate angle irons for building a bottom frame, each angle iron having
a horizontal member that can be connected to a supporting surface for said shelter with said second fasteners, and
a vertical member that can be connected to one end of said panels with said third fasteners; and
four L-shaped connectors that can be connected to adjacent ends of said vertical members of adjacent ones of said angle irons, each said connector to be located on an outside surface of said angle iron;

whereby adjacent ones of said panels form a diaphragm pair such that energy from a striking projectile can dissipate over said diaphragm pair, a wall panel of said diaphragm pair can flexibly deform in response to being struck by the projectile and a joint between adjacent ones of said panels of said diaphragm pair can partially pivotally separate relative to each other and said connecting cap portions can partially separate from each other so as to provide a yielding surface, said diaphragm pair thereby being able to resist penetration of the projectile therethrough.

21. A kit for building a protective shelter as claimed in claim 20, said kit further comprising:

a connecting cap mountable over adjacent panel returns and only an inward section of adjacent side portions of said middle panels, said connecting cap comprised of a first cap portion and a second cap portion, each cap portion having a first section that overlaps a part of said panel side portion, an end section that overlaps said return, and a second section at least substantially perpendicular to said first section that extends beyond said side portion inwardly facing edge, said second section of said first cap portions overlapping said second section of said second cap portion, each cap first section having a second plurality of vertically spaced holes that correspond to said first plurality of vertically spaced holes;

said first fasteners extendable through corresponding ones of said connecting cap second plurality of vertically spaced holes such that said cap portions and said adjacent panel side portions are connectable together.

22. A prefabricated protective shelter which encloses an inner space, said shelter comprising a front wall;

a rear wall;

two side walls;

wherein said walls are each comprised of a plurality of elongate vertical C-shaped end panels and a plurality of elongate vertical C-shaped middle panels, each middle panel being symmetrical about a longitudinal axis and comprised of a flexible front web portion, and two side portions integral with said web portion extending inwardly and being at least substantially perpendicular to said web portion, said side portions having an inwardly facing edge and an opposite outer edge integral with said web portion, a first plurality of vertically spaced holes in said side portions, and return portions integrally connected to corresponding inwardly facing edges of said side portions, said return portions extending at least substantially parallel to said web portion;

a connecting cap mounted over adjacent panel returns and only an inward section of adjacent side portions of said middle panels, said connecting cap comprised of a first cap portion and a second cap portion, each cap portion having a first section that overlaps a part of said panel side portion, an end section that overlaps said return, and a second section at least substantially perpendicular to said first section that extends beyond said side portion inwardly facing edge, said second section of said first cap portions overlapping said second section of said second cap portion, each cap first section having a second plurality of vertically spaced holes that correspond to said first plurality of vertically spaced holes; and fasteners that securely connect adjacent ones of said panels and said connecting cap by extending through corresponding ones of said first and second plurality of vertically spaced holes such that adjacent ones of said panels form a diaphragm pair such that energy from a striking projectile can dissipate over said diaphragm pair, a wall panel of said diaphragm pair can flexibly deform in response to being struck by the projectile and a joint between adjacent ones of said panels of said diaphragm pair can partially pivotally separate relative to each other and said connecting cap portions can partially separate from each other so as to provide a yielding surface, said diaphragm pair thereby being able to resist penetration of the projectile therethrough.

23. A section of a wall for a structure comprised of a plurality of vertical C-shaped panels, each panel comprising a flexible front web sheet portion having an outside surface and an inside surface facing an inward direction, and two side sheet portions integral with said web portion and extending inwardly at least substantially perpendicular to said front web portion, said side portions having an inwardly facing edge and an opposite outer edge integral with said web portion, return portions integrally connected to corresponding inwardly facing edges of said side portions, said return portions extending at least substantially parallel to said web portion, and a plurality of vertically spaced holes in said side portions, said holes each being located closer to said inwardly facing edge than said outer edge; and a plurality of first fasteners each of which securely connect adjacent ones of said panels by extending at least substantially parallel to said front web portion through corresponding ones of said vertically spaced holes such that adjacent ones of said panels form a diaphragm pair so that energy from a striking projectile can dissipate over said diaphragm pair, a wall panel of said diaphragm pair can flexibly deform in response to being struck by the projectile and a joint between adjacent panels of said diaphragm pair can partially pivotally separate relative to each other so as to provide a yielding surface, said diaphragm pair thereby being able to resist penetration of the projectile therethrough.

* * * * *